United States Patent [19]

Kervistin

[11] Patent Number: 5,297,386
[45] Date of Patent: Mar. 29, 1994

[54] COOLING SYSTEM FOR A GAS TURBINE ENGINE COMPRESSOR

[75] Inventor: Robert Kervistin, le Mee sur Seine, France

[73] Assignee: Societe Nationale d'Etude et de Construction de Moteurs d'Aviation (S.N.E.C.M.A.), Valin, France

[21] Appl. No.: 98,864

[22] Filed: Jul. 29, 1993

[30] Foreign Application Priority Data

Aug. 26, 1992 [FR] France ............................ 92 10277

[51] Int. Cl.$^5$ ........................... F02C 7/18; F02K 3/04
[52] U.S. Cl. .................................... 60/226.1; 60/266; 415/115
[58] Field of Search ............... 60/39.07, 39.83, 226.1, 60/266; 415/115, 116, 117

[56] References Cited

U.S. PATENT DOCUMENTS

| | | | |
|---|---|---|---|
| 3,647,313 | 3/1972 | Koff | 415/116 |
| 4,187,675 | 2/1980 | Wakeman | 60/34.75 |
| 4,254,618 | 5/1981 | Elovic | 60/226.1 |
| 4,645,415 | 2/1987 | Hovan et al. | 415/116 |
| 4,657,482 | 4/1987 | Neal | 415/116 |
| 4,795,307 | 1/1989 | Liebl | 415/115 |
| 4,849,895 | 7/1989 | Kervistin | 60/39.75 |
| 4,920,741 | 5/1990 | Liebl | 415/115 |
| 5,163,285 | 11/1992 | Mazeaud et al. | 60/39.07 |

FOREIGN PATENT DOCUMENTS

| | | |
|---|---|---|
| 2482196 | 11/1981 | France . |
| 2485632 | 12/1981 | France . |
| 1217807 | 12/1970 | United Kingdom . |
| 1244340 | 8/1971 | United Kingdom . |
| 2018362 | 10/1979 | United Kingdom . |

Primary Examiner—Louis J. Casaregola
Attorney, Agent, or Firm—Bacon & Thomas

[57] ABSTRACT

A cooling system for an axial flow compressor of a gas turbine engine is disclosed having a device to tap a portion of air from the primary air flow flowing through the axial compressor and a control device associated with the tap to control the amount of air tapped from the primary air flow. The system also includes a cooling device to cool the portion of air tapped from the primary air flow, which cooled air is directed into a cooling air chamber. The cooling air chamber is located between the last rotor stage of the compressor and a cone attached to the last stage and extending downstream from the rotor wheel. Nozzles associated with the cooling air chamber direct cooling air from the chamber onto the rotating rotor wheel such that a portion of the cooling air passes into the peripheral groove defined by the rotor wheel between the wheel and the blade root, while another portion of the cooling air from the nozzles is directed onto the surface of the cone in order to cool the blades and the cone.

7 Claims, 1 Drawing Sheet

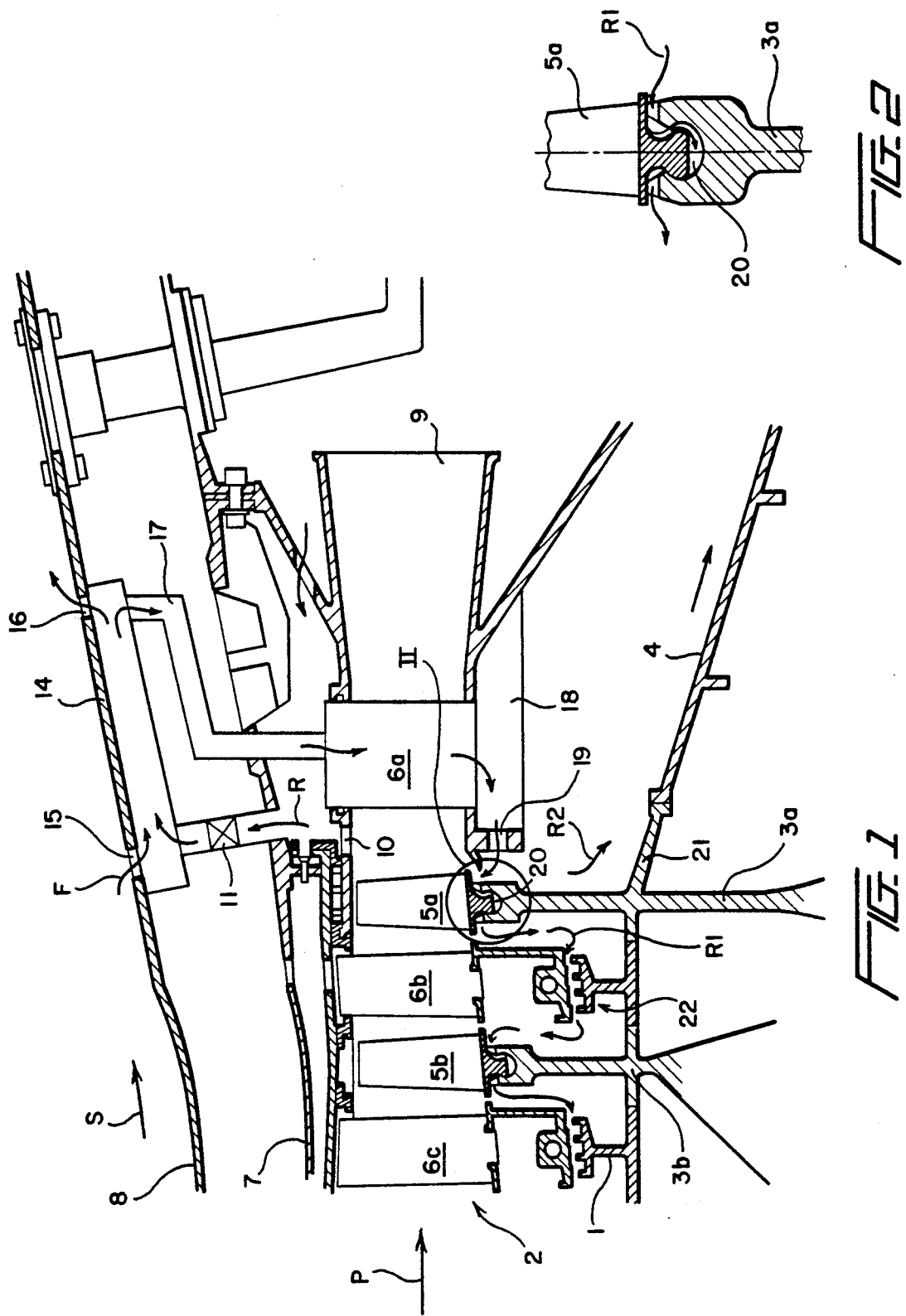

COOLING SYSTEM FOR A GAS TURBINE ENGINE COMPRESSOR

BACKGROUND OF THE INVENTION

The present invention relates to system for cooling the compressor of a gas turbine engine and to supply air to the clearances between the rotating and stationary parts of the compressor.

Modern gas turbine engines, particularly those utilized in aircraft applications, are using higher and higher air temperatures at the compressor outlet in order to increase the power and efficiency of the gas turbine engine. The air temperatures are often at the limit and sometimes beyond the temperature limits for the elements which come into contact with the air. This is particularly true with the peripheral grooves defined by the rotor wheels in which turbine blades are mounted, especially at the downstream stages of the axial compressor.

It is also known to provide clearances between the rotating and stationary portions of the gas turbine engine and to provide labyrinth seals between these elements in order to increase the efficiency and to provide maximum thrust for the gas turbine engine. Systems are also known for adjusting the radial clearances between the rotating and stationary portions of the engine. U.S. Pat. No. 4,849,895 discloses such a system which utilizes real-time adjustment for adjusting the radial clearances between the gas turbine engine rotor and stator as a function of flight conditions of the aircraft. The system utilizes an air flow regulating valve which is controlled by a computer.

Systems are also known for cooling portions of the gas turbine engines. U.S. Pat. No. 4,254,618 discloses turbine cooling system utilizing an air/air heat exchanger. This system is incorporated into a turbofan engine in which the cooling air circulating through the heat exchanger is tapped from the cold flow bypass duct and is utilized to cool a portion of the hot air flowing through the gas turbine compressor. The cooled air is subsequently applied to the compressor.

French Patent 2,485,632 discloses a rotor wheel/-blade root structure which facilitates the passage of air between these elements in order to cool the blades and the peripheral groove of the rotor wheel.

Systems are also known to cool the air of the primary air flow circulating in the compressor. French Patent 2,482,196 describes a heat exchanger mounted between a low pressure compressor and a high pressure compressor with air being tapped from the bypass flow. The heat exchanger in this case is used to cool the primary air flow and to heat the bypass air flow. This design allows combining the thermodynamic gain of the intermediary cooling of the primary flow with the propulsive gain linked to heating the bypass flow.

SUMMARY OF THE INVENTION

A cooling system for an axial flow compressor of a gas turbine engine is disclosed having a device to tap a portion of air from the primary air flow flowing through the axial compressor and a control device associated with the tap to control the amount of air tapped from the primary air flow. The system also includes a cooling device to cool the portion of air tapped from the primary air flow, which cooled air is directed into a cooling air chamber. The cooling air chamber is located between the last rotor stage of the compressor and a cone attached to the last stage and extending downstream from the rotor wheel. Nozzles associated with the cooling air chamber direct cooling air from the chamber onto the rotating rotor wheel such that a portion of the cooling air passes into the peripheral groove defined by the rotor wheel between the wheel and the blade root, while another portion of the cooling air from the nozzles is directed onto the surface of the cone in order to cool the blades and the cone.

The tap for tapping a portion of the air from the primary flow is located between the last rotor blade stage (measured in the direction of the primary air flow through the compressor) and the last guide vane stage (measured in the direction of the primary air flow through the compressor). The flow control device may comprise a flow control valve controlled by a computer so that the tapped air portion corresponds to the operating parameters of the gas turbine engine. The heat exchanger may also be an air/air heat exchanger. If the system is utilized in a turbofan-type gas turbine engine, a portion of the relatively cooler air from the bypass duct may be directed through the heat exchanger in order to cool portion of the air tapped from the primary flow through the compressor.

BRIEF DESCRIPTION OF THE DRAWINGS

FIG. 1 is a partial, longitudinal cross-sectional view of a gas turbine engine illustrating the cooling system according to the present invention.

FIG. 2 is a partial, cross-sectional view of Area II shown in FIG. 1.

DETAILED DESCRIPTION OF THE PREFERRED EMBODIMENT

In FIG. 1, 1 denotes the rotating portion of a high-pressure axial flow compressor 2 of a turbofan-type turbojet engine. The rotating portion 1 comprises a plurality of stages of rotor wheels $3a$, $3b$ and a cone 4 which is attached to and extends downstream from the last (measured in the direction of the primary air flow through the compressor) rotor wheel $3a$. The peripheries of the rotor wheels $3a$, $3b$ define grooves in which rotor blades $5a$, $5b$ are mounted in known fashion. The rotor blades $5a$, $5b$ are mounted on the rotor wheels so as to extend radially outwardly therefrom. Each of the rotor blades $5a$, $5b$ has a root portion which is inserted into the peripheral groove of the associated rotor wheel. A plurality of stages of stationary guide vanes $6a$, $6b$ and $6c$ are located adjacent to the rotor blade stages $5a$ and $5b$. In known fashion, the guide vanes 6 are attached to the stationary case 7 of the compressor 2.

Primary air flows through the stages of the guide vanes 6 and the rotor blades 5 in the direction of arrow P in FIG. 1. The turbofan-type engine also has a bypass air duct through which the bypass air flows in the direction of arrow S in FIG. 1. The inner boundary of the bypass air duct is defined by wall 8 while the outer boundary is defined by the outer housing of the turbofan engine (not shown).

After passing through the compressor 2, the primary air flow P is directed into the combustion chamber (not shown) of the turbojet engine through diffuser 9. According to the invention, a portion R of the primary air flow P is tapped from the compressor 2 through tap 10 located between the last rotor blade stage $5a$ and the last guide vane stage $6a$ upstream of the diffuser 9. The tap 10 directs the tapped cooling air R through a flow control regulating valve 11 located outside the compressor case 7 and which, in known fashion, may be connected to an electronic control, such as a computer, to control the quantity of the cooling air R tapped from the primary air flow P as a function of compressor characteristics and sensed temperature in order to minimize the clearances between the rotating portions of the compressor and the stationary portions of the compressor. If the gas turbine is associated with an aircraft having an on-board computer, this computer may function to control the flow control valve 11.

After passing through the flow control valve 11, the tapped cooling air R enters an upstream portion of heat exchanger 14 which is located between the primary air flow P and the bypass airflow S, between the compressor case 7 and the wall 8. Preferably, heat exchanger 14 is of the air/air heat exchanger type in which a portion F of the bypass airflow S is tapped from the bypass duct at 15 and directed into the heat exchanger 14. The cooler air flow F cools the air R and is then returned to the bypass duct via exit 16 located in a downstream portion of the heat exchanger 14.

After passing through the heat exchanger 14, the cooling air R is lowered in temperature and issues into a conduit 17 which connects the heat exchanger 14 to the downstream stage of the guide vanes 6a. The cooled air portion R passes through one or more of the guide vanes 6a and is directed into chamber 18 located between the last stage of the compressor 2 and the cone 4. Chamber 18 has an upstream wall in which are mounted nozzles 19 which face the rotor wheel 3a at the position generally aligned with the peripheral grooves formed in the periphery of rotor wheel 3a. The nozzles 19 direct air from the chamber 18 onto the rotor wheel 3a in a counter-flow direction to that of the primary air flow P. The nozzles 19 are arrayed in such a manner that they generate a component tangential to the cooling air R injected against the rotor wheel 3a in order to enhance the air supply to the bottoms of the peripheral grooves.

A space 20 is defined between the bottoms of the blade roots and the bottom of the peripheral groove to allow a portion R1 of the cooling air emanating from the nozzles 19 to circulate between the blade root and the rotor wheel in a direction generally opposite to that of the primary air flow P. A cooling air portion R2, also emanating from the nozzles 19 flows over the downstream facing surface of the rotor wheel 3a, the downstream flange 21 and over the surface of the cone 4 in order to cool these elements.

Because of the pressure differential prevailing in the various stages of the compressor 2, the cooling air portion R1, after crossing the rotor wheel 3a, flows through labyrinth seal 22 to seal the clearances between the rotating portion 1 and the stationary portion of the compressor associated with guide vane stage 6b. The cooling air portion R1 subsequently passes through the rotor wheel 3b in the same fashion as previously described in relation to rotor wheel 3a. Thus, as can be seen, the cooling air portion R1 circulates from stage to stage of the compressor in counterflow direction to the primary air flow P passing through the compressor 2.

The computer control (not shown) for the flow control valve 11 controls the flow of cooling air, which thereby controls the temperatures of the rotating portions of the compressor, so as to control the clearances between the outermost tips of the rotor blades 5a and 5b and the stationary portions of the compressor, as well as the clearances between the stationary and rotating portions of the labyrinth seals 22. Under certain operating conditions of the aircraft on which the engine is located, such as when cruising, the cooling may be substantially reduced or eliminated if the outlet temperatures of the compressor 2 are sufficiently cool. The electronic computer control is supplied with data concerning the dimensional, mechanical and thermal features of the rotor wheels and the control of the clearances is carried out exactly as disclosed in U.S. Pat. No. 4,849,895.

The foregoing description is provided for illustrative purposes only and should not be construed as in any way limiting this invention, the scope of which is defined solely by the appended claims.

I claim:

1. A cooling system for an axial flow compressor of a gas turbine engine having a rotor with a plurality of rotor wheels and a cone located downstream of the rotor wheels in a direction of flow of primary air P through the compressor, each rotor defining a peripheral groove in which are mounted root portions of rotor blades and a plurality of guide vane stages located axially between the rotor wheel blades, the cooling system comprising:
  a) tap means to tap a portion of air R from primary air flow P;
  b) control means operatively associated with the tap means to control the amount of air R tapped from the primary air flow P;
  c) cooling means operatively connected to the tap means to cool the portion of air R tapped from the primary air flow P;
  d) a cooling air chamber;
  e) conduit means directing the air R from the cooling means into the cooling air chamber; and,
  f) nozzle means operatively associated with the chamber to direct a portion R1 of air R onto the rotor wheel in a direction generally opposite to the direction of primary flow P such that portion R1 flows between the root portions of the rotor blades and the peripheral grooves to cool the root portions, and to direct a portion R2 of air R onto the cone so as to cool the cone.

2. The cooling system of claim 1 wherein the tap means is located between the most downstream rotor wheel and the most downstream guide vane stage measured in the flow direction of primary air P.

3. The cooling system of claim 1 wherein the control means comprises a flow control valve.

4. The cooling system of claim 1 wherein the cooling means comprises a heat exchanger.

5. The cooling system of claim 4 wherein the heat exchanger comprises an air/air heat exchanger.

6. The cooling system of claim 5 wherein the gas turbine engine is a turbofan engine having a bypass air duct with an air flow S and further comprising second tap means to tap a portion F of air flow S and direct it into the air/air heat exchanger.

7. The cooling system of claim 1 wherein the cooling air chamber has an upstream wall and wherein the nozzle means are mounted on the upstream wall.

* * * * *